Feb. 18, 1936.   R. A. MILLER   2,031,173
BORING MACHINE
Filed April 30, 1934   7 Sheets-Sheet 5
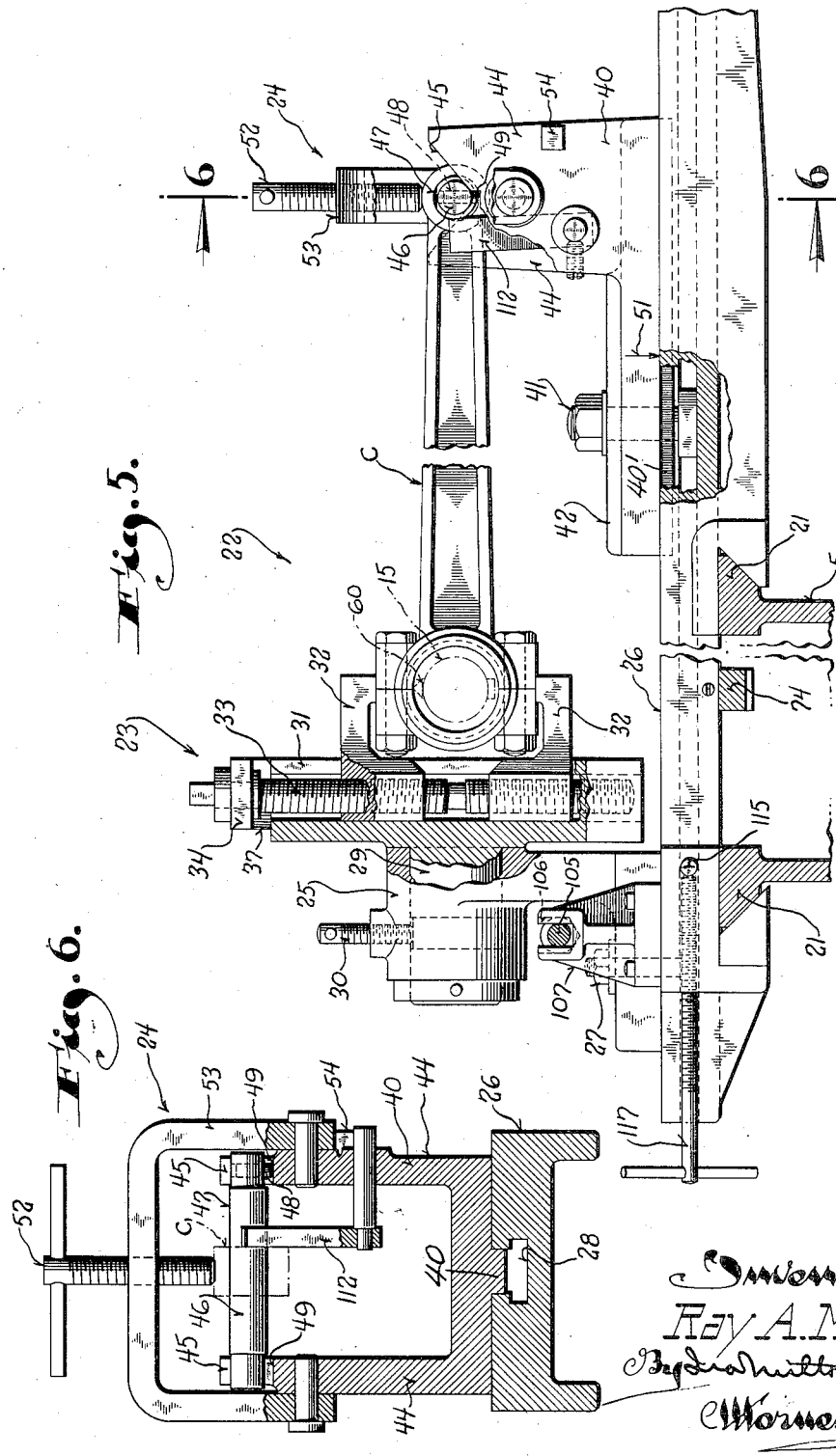

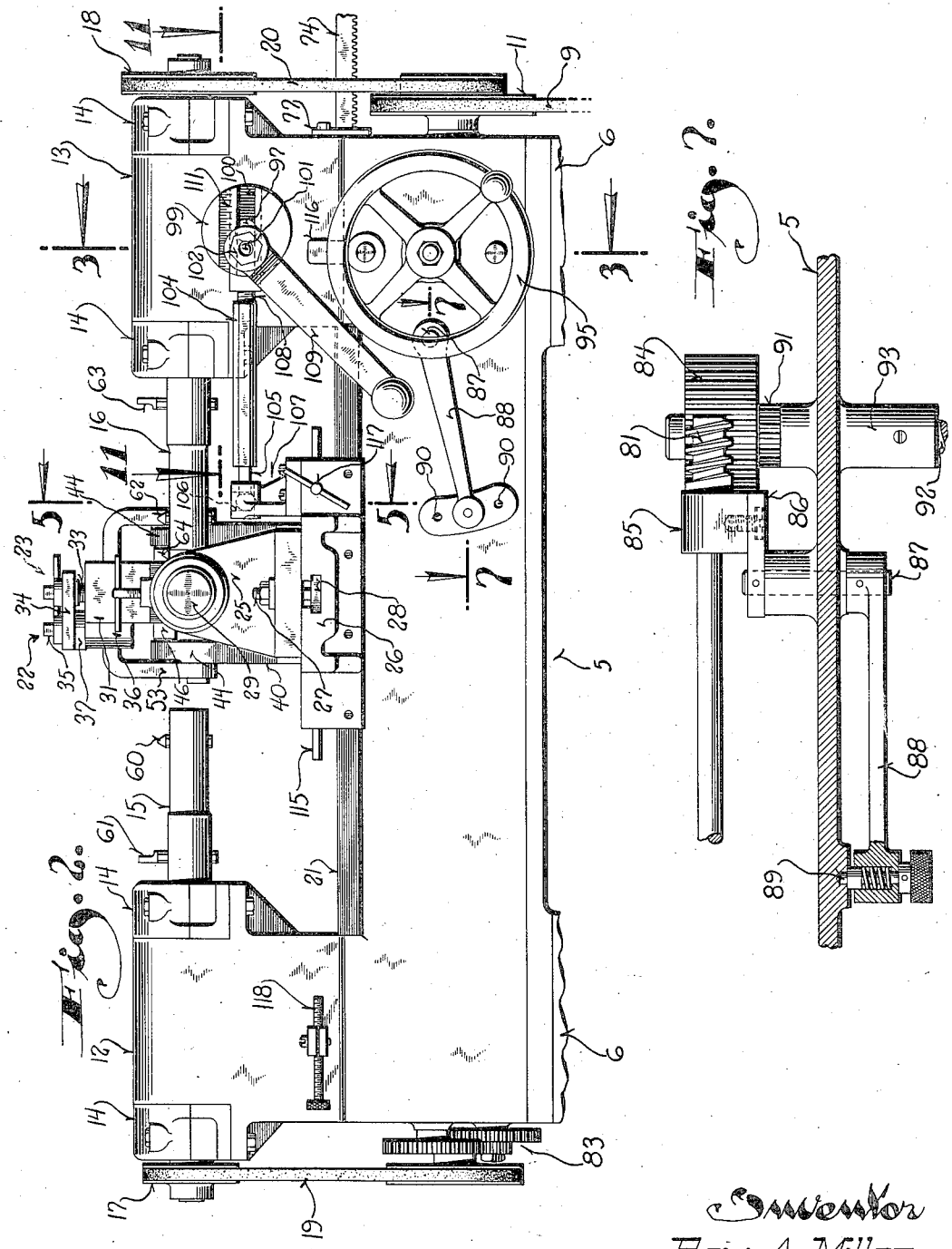

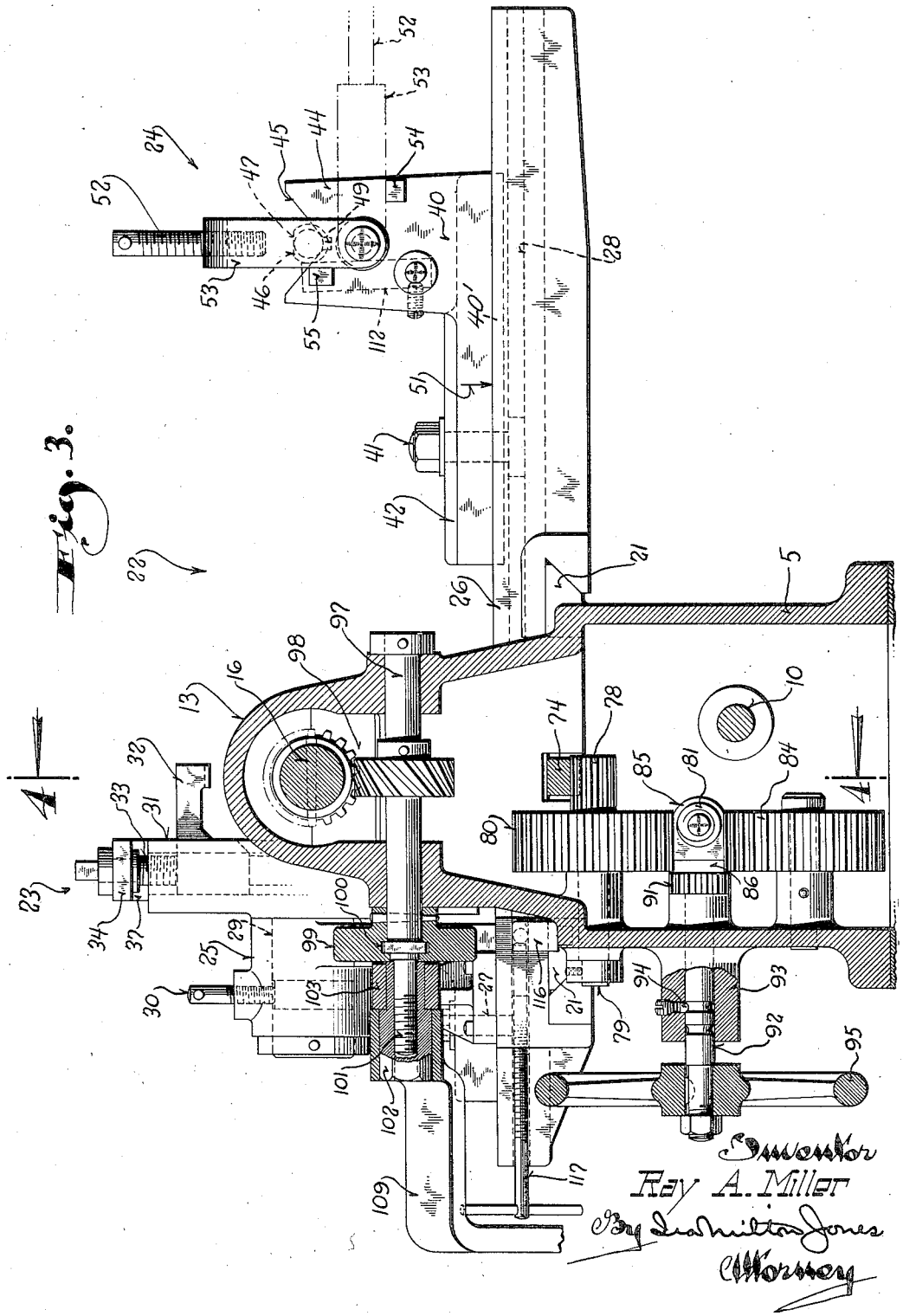

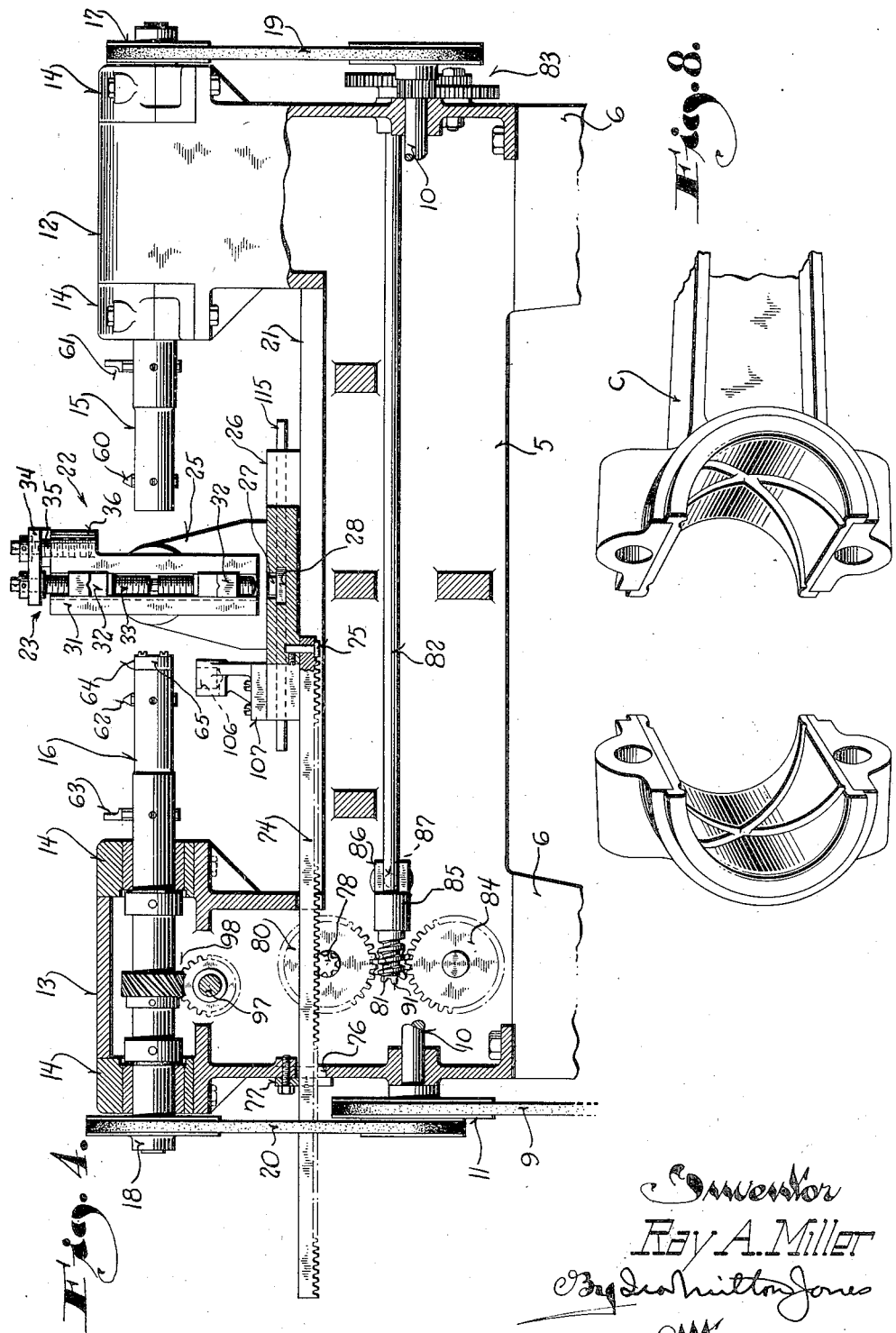

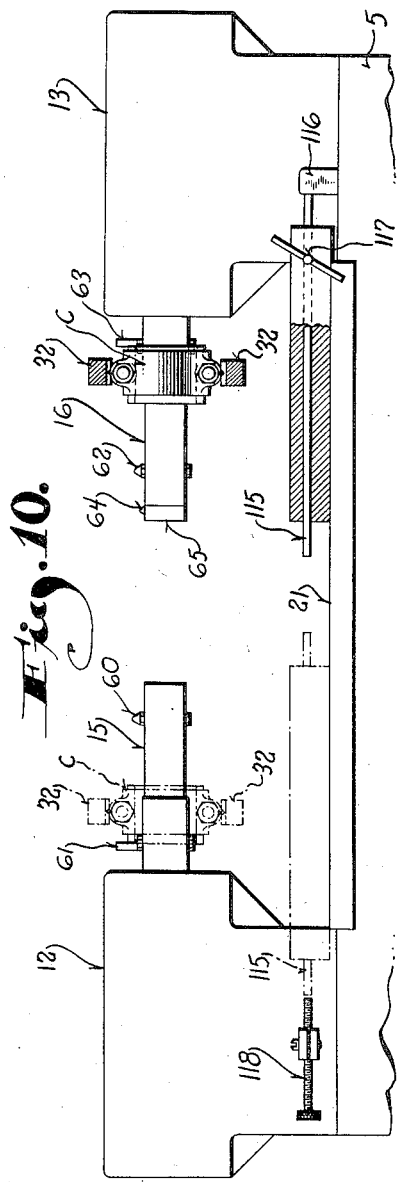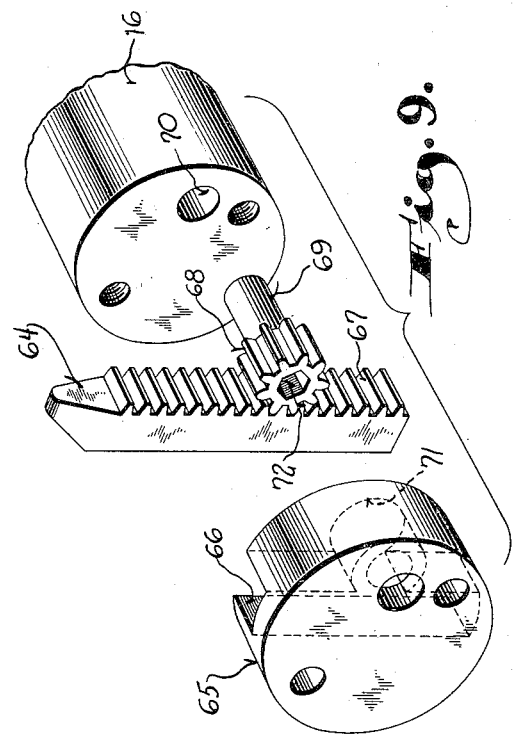

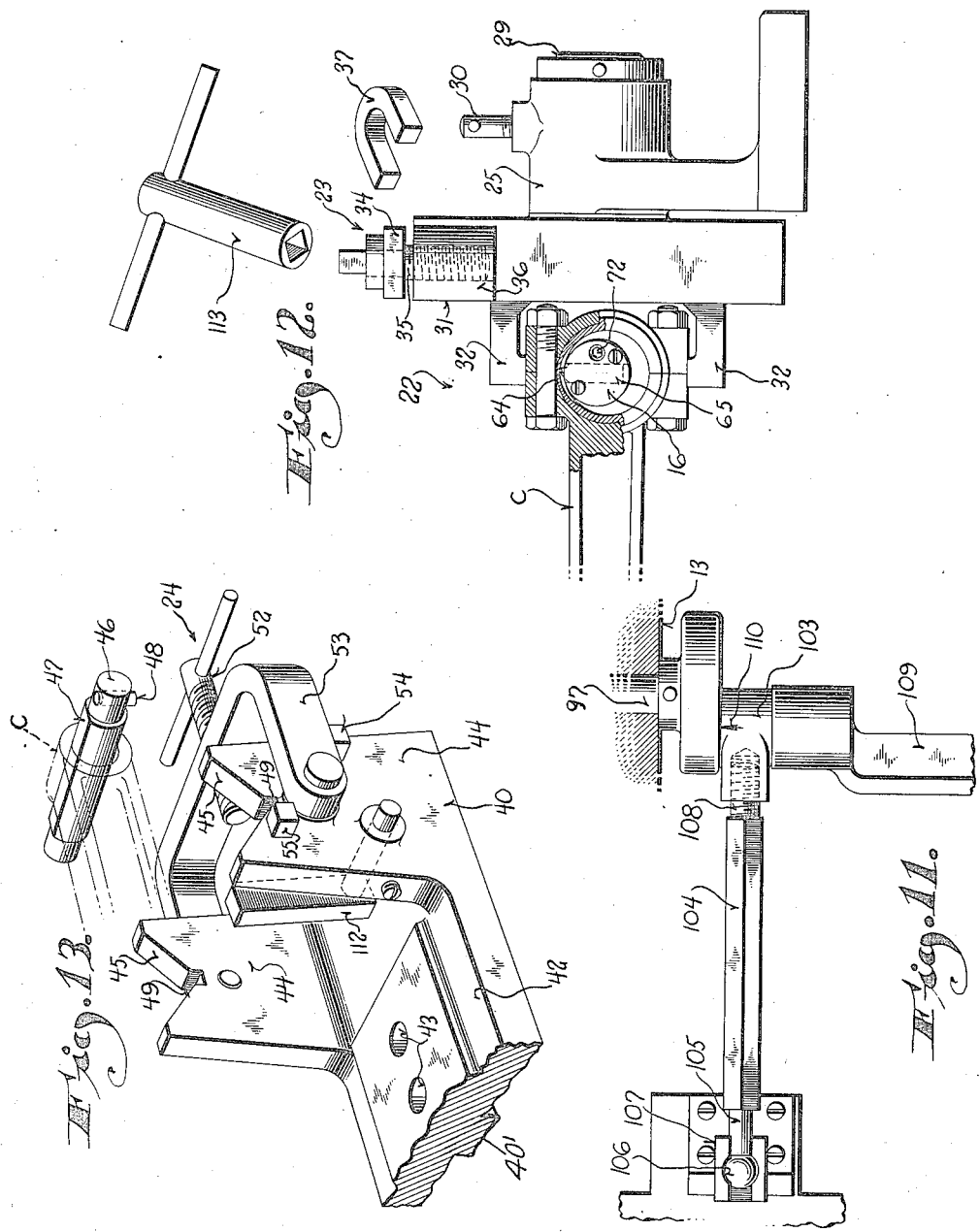

Patented Feb. 18, 1936

2,031,173

UNITED STATES PATENT OFFICE 2,031,173

BORING MACHINE

Ray A. Miller, Port Washington, Wis., assignor to Simplicity Manufacturing Company, Port Washington, Wis., a corporation of Wisconsin Application April 30, 1934, Serial No. 723,159

26 Claims. (Cl. 29—26)

This invention relates to boring machines and refers more particularly to the machining of connecting rod bearings.

Worn or burnt-out connecting rod bearings are generally rebabbitted. These rebabbitted bearings must be bored, faced, and provided with oil grooves, and it is for this purpose that the machine of the present invention is designed, it being a particular object of the invention to provide a machine by which all of these machining operations may be performed with one "set-up."

More specifically, it is an object of this invention to provide a machine which will rough-bore, cut oil grooves, finish bore and face the bearing ends all with one set-up of the machine.

Another object of this invention is to provide means for centering and holding the connecting rod, which is so constructed that after the machine has been adjusted to connecting rods of one size, the centering and gripping of succeeding rods of the same size is a simple matter requiring merely the tightening of two screws.

Another object of this invention resides in the provision of simple stop means to limit the depth of the facing cuts to insure cutting the bearing to proper length.

Another object of this invention is to provide a machine having two boring heads operable successively on the work, so that rough and finish boring and facing of both ends of a bearing may be done without changing of tools.

Another object of this invention resides in the provision of novel means for centering and properly locating the connecting rod with respect to the boring spindles by means of a pin passed through the wrist pin hole and clamping means to simultaneously clamp the connecting rod to the pin and fix the pin at a definite position.

Another object of this invention resides in the provision of novel means for driving the carriage which carries the bearing, in either direction.

Another object of this invention is to provide a machine in which a boring spindle upon being disengaged from its power drive may be manually actuated to cut an oil groove in the bearing which by the same manual actuation is moved endwise with respect to the spindle to cause the groove being cut to take the form of an ellipse.

Another object of this invention resides in the provision of a novel adjustable cutter on one of the boring spindles for cutting oil grooves in the bearings.

A further object of this invention is to provide a novel two jaw chuck construction for gripping the connecting rods to hold them properly aligned with the boring spindles, which chuck is so constructed as to permit shifting of the entire bearing to a position eccentrically disposed with respect to the spindles for cutting eccentric grooves or oil recesses and pockets in the bearing.

With the above and other objects in view which will appear as the description proceeds, the invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention constructed according to the best mode so far devised for the practical application of the principles thereof, and in which:

Figure 2 is a front elevation of the machine;

Figure 3 is a cross section view taken through Figure 2 on the plane of the line 3—3;

Figure 4 is a view substantially in longitudinal section and viewing the machine from the back, said view being taken on the plane of the line 4—4 of Figure 3;

Figure 5 is an enlarged detail view taken on the plane of the line 5—5 of Figure 2, to illustrate the manner of holding the connecting rod;

Figure 6 is a detail section view taken through Figure 5 on the plane of the line 6—6;

Figure 7 is a detail section view taken through Figure 2 on the plane of the line 7—7;

Figure 8 is a perspective view showing a typical connecting rod bearing which has been bored, faced and grooved;

Figure 9 is a detail perspective view of the grooving cutter with the parts thereof separated and in their proper order of assembly;

Figure 10 is a diagrammatic view to illustrate the manner in which the stop is adjusted to properly limit the travel of the carriage during the facing operation;

Figure 11 is a detail view taken on the plane of the line 11—11 of Figure 2;

Figure 12 is a detail view showing the manner in which eccentric recesses or pockets can be cut in the bearing; and Figure 13 is a perspective view showing the support for the wrist pin end of the connecting rod.

Figure 1:
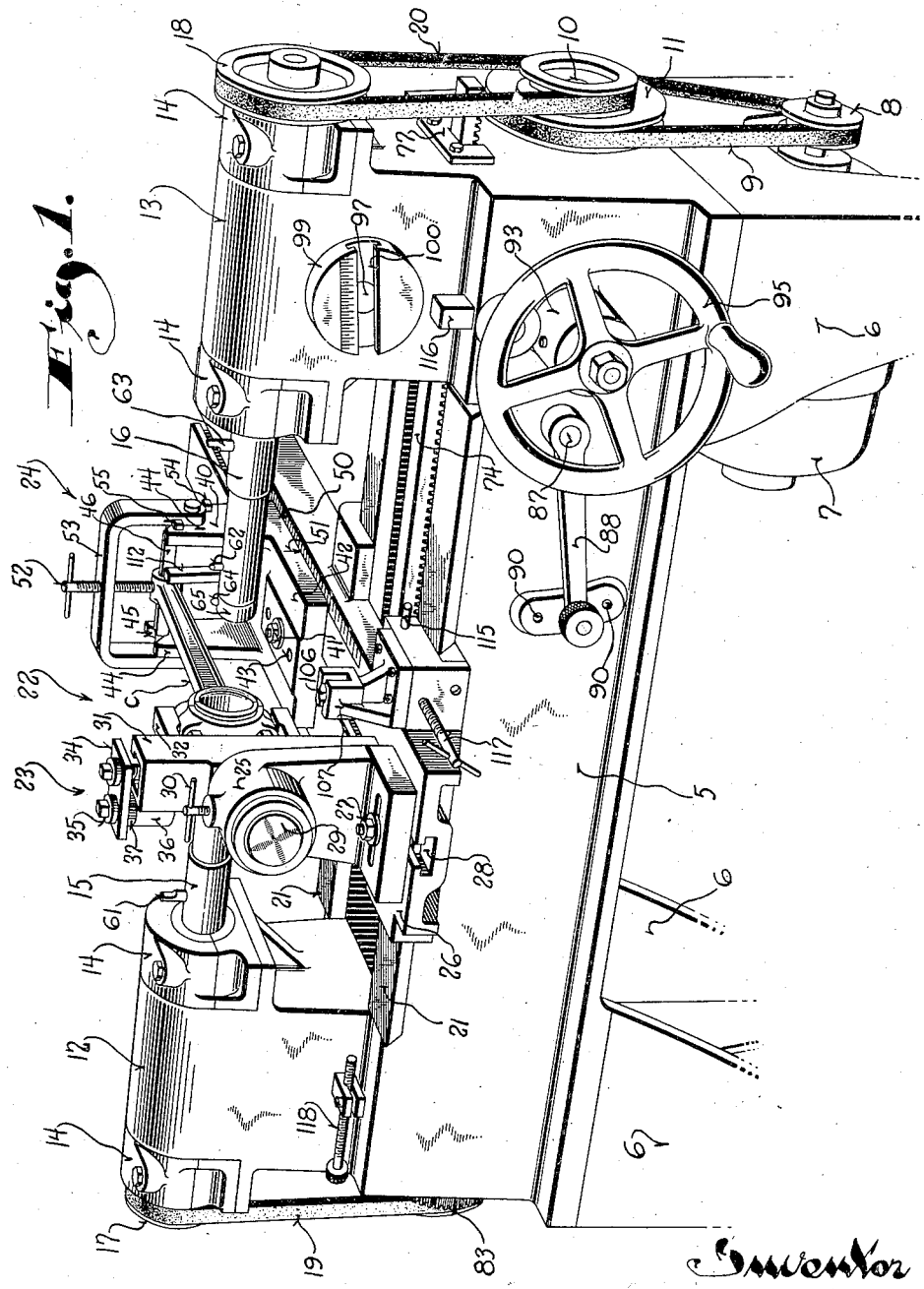
Figure 1 is a perspective view of a machine embodying this invention.

Referring now more particularly to the accompanying drawings, in which like numerals indicate like parts throughout the several views, the numeral 5 designates the supporting bed of the machine which is supported on feet 6. Suspended from the underside of the bed 5 at one end thereof, is a drive motor 7 having a driving pulley 8 disposed outwardly of the adjacent end of the bed.

The pulley 8 is drivingly connected through a belt 9 trained about it and a pulley 11, with a drive shaft 10 extending longitudinally across the entire bed and having its ends journalled in bearings carried by the ends of the bed.

At the ends of the bed there are upstanding heads 12 and 13 provided with bearings 14, in which boring spindles 15 and 16 are journalled. The spindles are in exact axial alignment and have drive pulleys 17 and 18, respectively, at their outer ends to be driven from the shaft 10 through belts 19 and 20 respectively.

Between the heads 12 and 13, the bed has spaced parallel rails or tracks 21 on which a carriage, indicated generally by the numeral 22, is slidably mounted. The carriage 22 is provided with means to be later described to hold a connecting rod "C" in position to be machined.

The means for holding the connecting rod, includes a two jaw chuck assembly 23 to grip the bearing end of the rod, and a wrist pin supporting fixture 24 to mount the wrist pin end of the rod.

The chuck assembly 23 comprises a supporting bracket 25 adapted to be adjustably clamped to the top face of bed 26 on the carriage 22 by means of a clamping bolt 27 having its head disposed in a T slot 28. The upper end of the bracket 25 affords a journal in which a trunnion 29 is adjustably mounted, a clamping screw 30, being provided to hold the trunnion against turning.

The trunnion 29 forms part of the chuck proper 31, which is grooved to slidably mount the jaws 32. A right and left threaded screw 33, rotatably but non-longitudinally movably mounted from a cross piece 34 at the upper end of the chuck provides means for moving the jaws 32 simultaneously toward and away from each other. The cross piece 34 is firmly secured in position by a screw 35 having a rotatable but non-longitudinally movable connection with the cross piece and threaded in a boss 36 on the side of the chuck.

Through the screw 35, the cross piece 34 and consequently the right and left threaded screw which carries the jaws, is bodily movable in the chuck to shift the same with respect to the carriage bed 26. Normally, a removable block 37 is positioned between the cross piece 34 and the top of the boss 36 and the screw 35 turned to clamp this block and firmly secure the cross piece against movement. In this position of adjustment, the center of the jaws 32 coincides with the axis of the boring spindles 15 and 16.

The wrist pin supporting fixture 24 comprises a bracket 40 slidably mounted on the carriage bed 26 and secured in adjusted position by a clamping bolt 41 having its head disposed in the T slot 28. A tongue 40' on the bottom of the bracket projects into the open slot 28 to firmly hold the bracket against any but sliding movement.

It will be noted that the bracket 40 has a comparatively long end portion 42 provided with three holes 43 for the reception of the clamping bolt 41. In this manner, connecting rods of considerable length may be accommodated without requiring an excessively long carriage bed 26, as the bracket 40 may be mounted in a position overhanging the end of the carriage bed.

At its outer end, the bracket has two spaced upstanding supporting walls 44 whose upper ends have V shaped recesses 45 to receive the end portions of a pin 46. Inasmuch as the end portions of the pin are round, the pin will automatically assume a position at the bottom of the V shaped recesses definitely located with respect to the bracket 40 and consequently the carriage bed 26.

A connecting rod having the pin disposed in its wrist pin hole thus will be held in a definite position with respect to the bracket 40 and the carriage bed 26, so that by properly locating the bracket on the carriage bed, the correct spacing between the axis of the wrist pin hole and the axis of the spindles will be determined.

To facilitate the proper location of the bracket 40 on the carriage bed 26, a scale 50 is carried by the carriage bed with which a marker 51 on the bracket 40 cooperates. The scale 50 is so graduated that when the bracket 40 is moved to a position at which its marker 51 registers with a selected designation the pin 46 will be positively located with its axis at the designated distance from the center of the boring spindles so that connecting rods of this length will be automatically secured in proper position merely by clamping the rods down onto the pins and the pins down into the V shaped recesses. This clamping action is effected by means of a screw 52 threaded in a U strap or bail 53 pivoted to the sides of the supporting walls 44 and adapted to swing from a horizontal position defined by a stop lug 54 to a vertical position defined by a lug 55.

To preclude the necessity for having a pin to accurately fit each of the different sized wrist pin holes, the medial portion of the pin 46, which is received in the wrist pin hole has a flat surface 47 to provide spaced edges with which the wall of the wrist pin hole contacts.

With the pin 46 held in its proper position of rotation by the engagement of a lug 48 projecting radially from one end portion of the pin and perpendicularly to the plane of the flat surface 47, in one of the notches 49 at the apexes of the V-shaped recesses 45, the edges at the sides of the flat surface are spaced equally on opposite sides of a plane bisecting the angle of the V-shaped recesses and perpendicular to the carriage bed 26. Consequently, upon the application of downward pressure on the top of the connecting rod, at a point lying in said plane which bisects the angle of the V-shaped recesses, the connecting rod assumes a position with the center of its wrist pin hole also lying in said plane even though the wrist pin hole is larger in diameter than the pin 46. In this manner, a few pins of different diameters will accommodate a wide range of sizes of wrist pin holes.

The spindle 15 has a boring tool 60 and a facing tool 61 and the spindle 16 has a boring tool 62 and a facing tool 63. The spindle 16 also mounts a grooving tool 64 for cutting the oil grooves into the bearing. The boring and facing tools are of conventional construction and are adjustably mounted on their respective spindles. The boring tool 62 is set to make the rough cut and the tool 60 is adjusted for the finish cut.

The grooving tool 64 is adjustably mounted in a novel manner best illustrated in Figure 9. The tool is secured to the outermost end of the spindle 16 by a cap 65 provided with a transverse channel 66 in which the tool is slidably mounted.

One side of the tool has rack teeth 67 with which a pinion 68 meshes. The pinion is journalled in the spindle by means of a stem 69 received in a bore 70 and is disposed in a cavity or recess 71 formed in the head 65 in communication with its transverse channel 66.

A hexagonal socket 72 in the pinion affords means for engaging an adjusting tool, not shown, with the pinion by which rotation may be imparted to the pinion to project or retract the grooving tool as will be readily apparent.

The carriage carrying the connecting rod is movable along the rails 21 to carry the bearing of the connecting rod past the boring cutters 60 and 62 and into engagement with the facing tools 61 and 63, by means of a rack 74 having one end fixed to the carriage as at 75 and its other end portion projecting through an opening 76 in the right hand end of the bed 5. A plate 77 is mounted on the end wall of the bed to hold the rack down onto a pinion 78 on the inner end of a stub shaft 79 journalled in the front wall of the bed. Consequently upon rotation of the pinion 78, the rack and with it the entire carriage is movable endwise of the bed.

The shaft 79 which carries the pinion 78 has a gear 80 fixed thereto with which a worm 81 meshes to impart rotation to the gear 80 and consequently the pinion 78 in one direction. The worm 81 is fixed to a shaft 82 which is driven from the drive shaft 10 at the left hand end of the machine through a gear train 83.

The bearing at the driven end of the shaft 82 has sufficient play to permit the opposite end of the shaft to which the worm is fixed, to be raised or lowered sufficiently to engage the worm with either the gear 80 or a similar gear 84 mounted on a stub shaft directly beneath the gear 80.

To selectively engage the worm 81 with either of the gears 80 or 84, the adjacent end of the shaft 79 is journalled in a bearing 85 carried by an arm 86, which in turn is pinned to a shaft 87 journalled in a bearing in the front wall of the bed. The outer end of the shaft 87 has a handle 88 fixed thereto by which the bearing 85 may be moved to mesh the worm with either of the gears 80 or 84.

To hold the handle 88 in either of its operative positions a spring pressed pin 89 is provided at the outer end thereof to engage in one of two recesses 90 formed in the adjacent wall of the bed. A third and central recess 90 is provided to receive the pin 89 and hold the handle in a neutral position with the worm disengaged from both of the gears 80 and 84.

The pitch of the worm 81 is such that when it is meshed with the gear 80, the rack will be drawn toward the right end of the machine to move the carriage toward the boring spindle 16 and when it is meshed with the gear 84, the rack will be pushed in the opposite direction.

To transmit the drive from the gear 84 to the gear 80 and consequently the rack pinion 78, an idler pinion 91 is provided which is movable to and from a position meshing with both of the gears 80 and 84. This pinion is fixed to a shaft 92 slidable and rotatable in a bearing 93 in the front wall of the bed and releasably held at either of its positions of axial movement by a spring detent 94.

When the shaft 92 is pushed in, the pinion 91 meshes with the gears 80 and 84 and transmits the drive from the gear 84, if driven by the worm, to the gear 80 and consequently the rack pinion 78.

The outer end of the shaft 92 mounts a hand wheel 95 to provide means for manually adjusting the location of the carriage. Obviously when the carriage is to be adjusted manually, the worm 81 is moved to its neutral position disengaged from both the gears 80 and 84.

It is to be observed that the drive to slide the carriage back and forth is stepped down a great extent so that the travel of the carriage and consequently the bearing past the boring tool is very slow. This insures a smooth bore.

For cutting oil grooves, the spindle 16 which carries the grooving tool 64 is actuated manually, and means are provided to slide the carriage back and forth through a predetermined distance during one complete revolution of the spindle so that the cut made by the grooving tool is in the form of an ellipse.

For this purpose, a cross-shaft 97 is journalled in bearings carried by the head 13 beneath the spindle 16. The spindle 16 and the cross-shaft 97 have meshing spiral gears 98 to afford a one-to-one ratio driving connection therebetween.

At its front end, the cross-shaft 97 mounts a disc 99 provided with a diametrically extending T slot 100. The T slot 100 is arranged to receive the square head of a screw 101 on which a nut 102 is threaded.

The nut has a tubular cylindrical extension on its inner end to engage the outer face of the disc 99 and provides a journal for one end 103 of a connecting rod or link 104. The opposite end 105 of the link has a readily detachable ball and socket connection 106 with an arm 107 fixed to the carriage. The link 104 has a threaded connection 108 with its connecting end 103 to afford adjustment of its length for a purpose to be hereinafter described.

As will be readily apparent, the screw 101 may be secured to the disc 99 at different distances from its center and when secured at any point spaced from its center, it forms a crank pin to oscillate the carriage back and forth through a distance determined by the setting of the screw 102 on the disc 99.

To turn the spindle 16 and the shaft 97, a crank 109 is provided. The socketed end of the crank fits the nut 102, and as only right hand rotation is required for the grooving operation, the cranking force may be applied through the nut.

Through the medium of the threaded connection 108 between the link 105 and its end 103, the length of the link is so adjusted that when the axis of the screw 101 coincides with the axis of the shaft 97 so that there is no crank motion, the grooving tool 64 is at the center of the connecting rod bearing spaced equally from its opposite ends. If the groove to be cut is to extend one-half inch on either side of the center of the bearing, the nut 102 is loosened and the screw moved to the right or the left of the center of the T slot which is then in its horizontal position, until the marker 110, (see Figure 11) registers with the one-half inch designation on a scale 111 formed directly on the disc 99.

If the screw is first secured, as shown in Figures 2 and 11, to the left of the center of the disc 99, the grooving tool 64 will commence its cut at the right hand end of the bearing or rather to the right of its center and will progress toward the left and across the center of the bearing an equal distance during the first half revolution of the spindle 16 and for the remaining half revolution the cut will be continued back to its starting point.

During the cutting of the groove many successive cuts are taken and after each cut the grooving tool is projected slightly farther by means of a suitable tool engaged in the socket 72 of its adjusting pinion until the proper depth has been obtained.

To cut the cross groove, the nut 102 is loosened and the screw forming the crank pin, moved to the opposite side of the center of the disc an equal distance and there tightened down, and by the same process of continued and successive cuts, the cross groove will be formed.

During the boring operations when the carriage is driven back and forth by the power means, as hereinbefore described, the link 104 is, of course, disconnected from the carriage, but it is not necessary that the same be removed from the disc 99, for if the screw 101 is tightened down in its position of axial alignment with the crossshaft 97, it will merely revolve inside the socketed end 103 without imparting any motion to the link, which may be permitted to hang down, as will be readily apparent.

The crank 109 is, of course, removed during the boring operations.

To center and set up the connecting rod, which, for purposes of illustration may be considered as measuring nine and one-half inches from the center of the wrist pin hole to the center of the bearing, the bracket 40 of the wrist pin supporting fixture is moved on the carriage bed 26 to the position at which its marker 51 registers with the designation nine and one-half inches on the scale 50.

A pin 46 is then inserted in the wrist pin hole of the connecting rod and mounted in position on the supporting walls 44 with the ends of the pin resting in the bottoms of the V shaped recesses in the upper ends of the walls. In this position, the bearing end of the connecting rod is received between the jaws of the two jaw chuck, which has been loosened to turn about the axis of its trunnion 29, so as to be free to adjust itself to the connecting rod. The clamping screw 52 is then drawn down tight onto the wrist pin end of the connecting rod, which automatically aligns the rod in all directions.

In placing the connecting rod, it is located as near the center of the fixture 24 as is possible without measuring, and to obviate the necessity for close adjustment in this respect, when setting up succeeding rods of the same size, an adjustable stop 112 is set so as to bear against the adjacent side of the rod.

With the connecting rod tightened down by the screw 52, the chuck is locked in position by its screw 30 and the two jaws tightened by means of a wrench 113 (see Figure 12) applied to the square end of the screw 33. The connecting rod is thus securely held and is now ready to be machined.

In machining the first of a group of rods of the same size, the carriage, after the rough boring of the bearing which is done by the tool 62, is moved by hand to bring the right hand end of the bearing into operative relationship with respect to the facing tool 63.

The operator then faces off this end of the bearing until the babbitt flange at this end of the bearing has been cut down to the desired thickness.

A stop rod 115 slidably carried by the carriage 22 with its ends projecting therefrom is then moved to a position engaging a fixed stop 116 and locked in position by a screw 117. Then the carriage is moved in the opposite direction either manually or by its power drive to finish bore the bearing, and after the finish boring, the power drive, if it has been used, is disconnected and the feed of the carriage toward the facing tool 61 is continued by hand.

The opposite or left hand end of the bearing is then faced off to the desired degree and when this is done, an adjustable stop screw 118 is moved to a position at which it just engages the adjacent end of the stop pin 115. The manner in which these adjustments are effected is illustrated diagrammatically in Figure 10. With the stop rod 115 secured in position, and the adjustable stop 118 properly set, all succeeding connecting rods of the same size, if properly located on the carriage by engaging the same with the stop 112 will be faced off to the proper distance merely by running the machine until the ends of the stop rod 115 engage the stops 116 and 118.

If it is desired to cut eccentric grooves or pockets into the bearing, this may be done as illustrated in Figure 12 by means of the grooving tool 64. For this purpose, the two jaw chuck is adjusted by means of the wrench 113 applied to the squared end of the screw 35, to move the jaws up or down as required after the block 37 has been moved.

As illustrated in Figure 2, by moving the jaw assembly downwardly, grooves or pockets may be cut into the side of the bearing which is uppermost and by bringing the jaw assembly above the center of the spindles, recesses or grooves may be cut in the opposite side of the bearing.

From the foregoing description taken in connection with the accompanying drawings, it will be readily apparent to those skilled in the art to which this invention appertains, that this invention provides in a single machine means for accurately boring, facing, and grooving connecting rod bearings with a single set-up of the rod, and that the securing of a rod in place to be machined is a simple matter requiring merely the tightening of a few clamping screws.

What I claim as my invention is:

1. A machine for boring the bearings of connecting rods and cutting oil grooves therein comprising, a boring spindle, a work supporting carriage movable in a direction parallel to the axis of the boring spindle to carry a connecting rod mounted thereon to and from operative relationship with respect to the spindle, a boring tool on the spindle to bore the bearing of the connecting rod, a grooving tool on the spindle to cut an oil groove in the bearing, and means to simultaneously revolve the spindle and move the work supporting carriage back and forth a predetermined distance to cause the grooving tool to cut an elliptical groove in the bearing.

2. A machine for boring and facing the bearings of connecting rods and cutting oil grooves therein, comprising two endwise spaced axially aligned boring spindles, a boring tool and a facing tool on each spindle, a carriage movable in a direction parallel to the axis of said spindles to carry the bearing of a connecting rod mounted on said carriage selectively into operative relationship with the boring and facing tools of either spindle, a grooving tool on one of the spindles, and means to simultaneously revolve said spindle and move the carriage back and forth through a predetermined distance to cause said grooving tool to cut a groove in the bearing elliptical in shape.

3. A machine for boring, end facing and grooving bearings of connecting rods comprising, two endwise spaced axially aligned boring spindles, a boring tool and a facing tool on each of said spindles, a work supporting carriage having means to grip a connecting rod and hold the same with its bearing in axial alignment with the axis of said spindles, means to move the carriage toward and from either spindle to move the bearing of a connecting rod thereon into operative relationship with the boring and facing tools of either spindle, a grooving tool on one of the spindles, and means to simultaneously revolve said spindle once and move the carriage back and forth through a selected distance to cause the grooving tool to cut an elliptical groove in the bearing.

4. A machine of the character described comprising, a boring spindle mounted to turn on a fixed axis, a work supporting carriage mounted to move in a direction parallel to the axis of the spindle, a rotatable member having a driving connection with the spindle to revolve with the same, and a crank connection between said rotatable member and the carriage to move the carriage back and forth through a selected distance during revolution of the boring spindle to cause a tool carried by the spindle to make an elliptical cut in work supported on said carriage.

5. A machine of the character described comprising, a boring spindle mounted to turn on a fixed axis, a rotatable member having a one-to-one ratio driving connection with the spindle to turn once for each revolution of the spindle, a sliding work supporting carriage mounted to move in a direction parallel to the axis of the spindle to carry work toward and from the spindle, and a crank connection between said rotatable member and the slidable carriage to move the carriage back and forth through a selected distance for each revolution of the spindle.

6. In a machine of the character described, a supporting bed, a head on the bed, a boring spindle journalled in said head, a rotatable member having a driving connection with the spindle to turn in unison with the spindle, a work supporting carriage slidable on the bed toward and from the head to carry work to and from operative relationship with respect to a tool on the spindle, and a member connected with the carriage and eccentrically connected with the rotatable member to move the carriage back and forth through a selected distance during revolution of the spindle to cause a tool carried thereby to make an elliptical cut in the work supported on the carriage.

7. In a machine of the character described, a boring spindle mounted to turn on a fixed axis, a boring tool on the spindle, a facing tool on the spindle, a work supporting carriage slidable toward and from the spindle to carry a connecting rod mounted thereon with its bearing in line with the spindle into operative relationship to the boring and facing tools to bore and face the bearing, a grooving tool on the spindle to cut an oil groove in the bearing, and a crank connection driven in unison with the spindle to automatically move the carriage back and forth through a selected distance simultaneously with revolution of the spindle to cut an elliptical groove in the bearing.

8. In a machine of the character described, a boring spindle, means to readily detachably grip and hold a connecting rod with its bearing in position to be acted upon by a tool carried by the boring spindle, said means including a support for the wrist pin end of the rod comprising, a pin loosely passed through the wrist pin hole of the rod and having spaced edges parallel to the axis of the pin with which the wall of the wrist pin contacts, means to support the ends of the pin, and a clamping screw to engage the wrist pin end of the rod at a point located on a plane substantially bisecting the distance between said edges to press the rod down onto said edges of the pin and the pin onto its support.

9. In a machine of the character described, a boring spindle, means to readily detachably grip and hold a connecting rod with its bearing in position to be acted upon by a tool carried by the boring spindle, said means including a support for the wrist pin end of the rod comprising, a pin loosely passed through the wrist pin hole of the rod and having spaced edges parallel to the axis of the pin with which the wall of the wrist pin contacts, means to support the ends of the pin, and a clamping screw to engage the wrist pin end of the rod at a point located on a plane substantially bisecting the distance between said edges to press the rod down onto said edges of the pin and the pin onto its support, the supports for the pin being formed so as to automatically shift the pin to move the connecting rod longitudinally in either direction to locate the connecting rod in a predetermined position with a predetermined distance between the axis of the wrist pin hole and the axis of the boring spindle regardless of variations in the diameter of the wrist pin hole.

10. In a machine for boring connecting rod bearings, a boring spindle rotatable on a fixed axis, a support for a connecting rod including a pin passed through the wrist pin hole of the connecting rod, spaced supporting members having substantially V-shaped recesses in their upper ends whose apexes lie in a vertical plane parallel to the axis of the spindle and spaced therefrom the exact distance to be maintained between the axes of the wrist pin hole and the bearing to be bored, said V-shaped recesses being adapted to receive the ends of the pin to support the same, and a clamping screw operable on the connecting rod to clamp the same down onto the pin and the pin down into the recesses, whereby the connecting rod is automatically shifted longitudinally in either direction as required to locate the same in the proper position with respect to the spindle upon the tightening of said clamping screw to insure the proper distance between the axes of its wrist pin hole and the bearing to be bored.

11. In a machine for boring connecting rod bearings, a boring spindle rotatable on a fixed axis, means to grip a connecting rod and hold the same with its bearing in position to be acted upon by a tool on the boring spindle, comprising spaced supports having V-shaped recesses whose apexes lie in a plane parallel to the axis of the spindle at a predetermined distance from the spindle axis and substantially perpendicular to the longitudinal axis of a connecting rod in position to be machined, a pin adapted to be loosely passed through the wrist pin hole of a connecting rod with its ends resting in the V-shaped recesses, said pin having its portion disposed within the wrist pin hole so shaped as to afford spaced edges with which the wall of the wrist pin hole contacts, means to hold the pin in a position of rotation with said edges accurately spaced equal distances from the plane passing through the apexes of the V-shaped recesses, and a clamping screw to bear down on the connecting rod above the pin.

12. In a machine for machining connecting rod bearings, means to hold a connecting rod in a predetermined position including spaced supports having V-shaped recesses, a pin adapted to be passed through the wrist pin hole of the connecting rod with its end portions resting in the V-shaped recesses, said pin having its portion which is disposed in the wrist pin hole so formed as to provide spaced edges to contact the inner wall of the wrist pin hole, means to hold the pin against turning in a position at which said edges lie in a plane parallel to the major axis of the connecting rod when the same is mounted in position, and a clamping screw to bear down on the connecting rod above the pin to secure the connecting rod on the pin and the pin in the V-shaped recesses.

13. In a machine for machining connecting rod bearings, means to hold the connecting rod in a predetermined position including a pair of spaced upright supports having V-shaped recesses, a pin adapted to be passed through the wrist pin hole of a connecting rod with its end portions resting in the V-shaped recesses, said pin having its portion disposed within the wrist pin hole formed so as to provide spaced edges to contact the inner wall of the wrist pin hole, means to hold said pin against turning in a position with said spaced edges disposed at equal distances from a plane bisecting the angle of said V-shaped recesses, and a clamping screw to engage the connecting rod at a point above and between said edges of the pin to clamp the connecting rod onto the pin and the pin down into the V-shaped recesses.

14. In a machine for machining connecting rod bearings, means to grip and hold the connecting rod in a predetermined position comprising, spaced upright supports having substantially V-shaped recesses in their upper ends, a pin adapted to be loosely passed through the wrist pin hole of the connecting rod and having its end portions resting in the bottoms of said V-shaped recesses, said pin having its portion which is received in the wrist pin hole so shaped as to provide edges to have an edge contact with the inner wall of the wrist pin hole, means on said pin and engageable with one of the supporting members to hold the pin against turning in a position at which said edges lie in a plane perpendicular to a plane bisecting the angle of said V-shaped recesses, a clamping screw, and a bail pivoted to said upright supports and in which the clamping screw is threaded, said bail being movable to a position locating the clamping screw over the connecting rod to clamp the connecting rod to the pin and the pin in the bottom of said V-shaped recesses, said clamping screw exerting its force along a line substantially coinciding with the plane bisecting the angle of the V-shaped recesses.

15. In a machine for machining connecting rod bearings, means to hold a connecting rod in a predetermined position including spaced upright supports having V-shaped recesses in their upper ends, a round pin adapted to be loosely received in the wrist pin hole of a connecting rod and to have its end portions resting in the V-shaped recesses, said round pin having its medial portion which is disposed in the wrist pin hole flattened to afford spaced edges adapted to have an edge contact with the inner wall of the wrist pin hole, means on the pin and engageable with one of the upright supports to hold the pin against turning in a position with its flat surface perpendicular to a plane bisecting the angle of said V-shaped recesses, a clamping screw, and a bail carrying the clamping screw and pivoted to said upright supports to swing on an axis substantially coinciding with the plane bisecting the angle of the V-shaped recesses to and from a position with the clamping screw arranged to bear down on a connecting rod in place and to engage the connecting rod above the flat surface of the pin and the apexes of the recesses.

16. In a machine for machining connecting rod bearings, a boring spindle rotatable on a fixed axis, a carriage movable to carry a connecting rod mounted thereon into operative relationship to the boring spindle, a chuck mounted on the carriage to grip the bearing end of the connecting rod, and a wrist pin supporting fixture to support the wrist pin end of the connecting rod, said wrist pin supporting fixture including means to clamp the connecting rod and automatically fix the same in a predetermined position with respect to the fixture, and said fixture being adjustable on the carriage so that the connecting rod upon being clamped to the wrist pin supporting fixture, may be automatically secured in a position with the axis of its wrist pin hole at a predetermined distance from the axis of the boring spindle.

17. In a machine for boring and facing connecting rod bearings including driven boring and facing tools, a movable carriage to hold a connecting rod with its bearing in alignment with the axis of rotation of said tools and carry the bearing selectively into operative relationship with either of said facing tools, and gauging means to limit the movement of the carriage toward the facing tools and thereby determine the depth of the cut made by the facing tools.

18. In a machine for boring and facing connecting rod bearings including driven boring and facing tools, a movable carriage to hold a connecting rod with its bearing in alignment with the axis of rotation of said tools and carry the bearing selectively into operative relationship with either of said facing tools, and gauging means to limit the movement of the carriage toward the facing tools and thereby determine the depth of the cut made by the facing tools, said gauging means comprising a fixed abutment, an adjustable stop, and a gauge bar movable with the carriage and engageable with said fixed abutment and adjustable stop.

19. In a machine for boring and facing connecting rod bearings including driven boring and facing tools rotatable about a common axis with the facing tools spaced apart, a carriage slidable in a direction parallel to the axis of rotation of said tools to carry a connecting rod selectively into operative relationship with either facing tool, gauge means to limit the movement of the slidable carriage to determine the depth of the cut of the facing tools comprising, a gauge bar adjustably mounted on the carriage, and stop abutments carried by a fixed part of the machine with which the ends of said gauge bar engage.

20. In a machine of the character described, a movable work supporting carriage, means to move said carriage comprising a rack connected with the carriage, a pinion meshing with the rack, and means to impart rotation to the pinion selectively in either direction comprising, spaced gears, a driven worm disposed between the gears, and means to move the worm to selectively engage the same with either of said spaced gears.

21. In a machine of the character described, a work supporting carriage movable back and forth on a supporting bed, means to move said carriage comprising, a rack connected with the carriage, a pinion meshing with the rack, and means to turn the pinion in either direction comprising, a pair of edgewise spaced gears, a worm adapted to mesh with the teeth of either of said gears, a long drive shaft for the worm journalled at its end remote from the worm in a fixed bearing, a movable bearing supporting the end of the shaft adjacent the worm, and means to move said bearing to carry the worm selectively into mesh with either of said spaced gears.

22. In a machine of the character described, a supporting bed having a spindle head at each end portion, a boring spindle journalled in each of said heads, and means to drive both of said spindles in unison comprising, a drive shaft extending throughout the length of the bed and journalled at its opposite end portions in bearings at the ends of the bed, a driving connection from said drive shaft to each of said spindles, a drive motor suspended from the bottom of the supporting bed and a driving connection from the motor to said drive shaft.

23. In a machine of the character described, a supporting bed, a spindle head at each end portion of the supporting bed, a boring spindle journalled in each of said heads, and a drive for said spindles comprising, a drive shaft extending throughout the length of the supporting bed and journalled in bearings at the end portions of the bed, a driving connection between each of the spindles and said drive shaft, an electric drive motor suspended from the underside of the supporting bed at one end portion thereof with its axis substantially in a vertical plane coinciding with the axis of the boring spindles, and a driving connection from said motor to the drive shaft.

24. In a machine of the character described, a boring spindle rotatable on a fixed axis, a chuck to grip work and hold it firmly in predetermined alignment with respect to the boring spindle comprising a fixed support, a pair of gripping jaws slidable on said fixed support, means to simultaneously move the jaws toward and from each other, and means to adjust the position of the jaws on said fixed support with respect to the axis of the boring spindle while retaining the jaws in their same relative positions.

25. In a machine of the character described, a boring spindle rotatable on a fixed axis, chuck means to grip and hold work in predetermined relative positions with respect to the axis of the spindle comprising, a fixed support having a slide-way, a pair of gripping jaws mounted in said slide-way, a right and left threaded screw engaging said jaws to simultaneously move the same toward and from each other, a movable support in which the right and left threaded screw is rotatably but non-longitudinally movably mounted, and adjustable means to mount said movable support from the fixed support, adjustment of said adjustable mounting means shifting the jaws bodily with respect to the axis of the spindle while retaining the jaws in their same relative positions.

26. In a machine for boring connecting rod bearings, a boring tool rotatable on a fixed axis, means including a pin loosely passed through the wrist pin hole of the connecting rod to grip and hold a connecting rod with its bearing in position to be acted upon by the boring tool, and transversely spaced means on the pin to engage the cylindrical surface of the wrist pin hole at transversely spaced portions operable as an incident to the gripping of the connecting rod to shift the same longitudinally in either direction to locate the same in such position with respect to the axis of rotation of the boring tool as to insure proper predetermined spacing between the axes of the bearing to be bored and the wrist pin hole of the connecting rod regardless of variations in the diameter of the wrist pin hole.

RAY A. MILLER.

CERTIFICATE OF CORRECTION.

Patent No. 2,031,173.  February 18, 1936.

RAY A. MILLER.

It is hereby certified that error appears in the printed specification of the above numbered patent requiring correction as follows: Page 5, first column, after line 69, claim 7, insert the following as claim 8:

8. In a machine of the character described, a boring spindle, a carriage movable with respect to the spindle to carry work into operative relationship thereto, and means on said carriage to readily detachably clamp a connecting rod in position to be acted upon by a tool on the boring spindle, said means including a clamp to grip the bearing end of the connecting rod, and a support for the wrist pin end of the connecting rod, and means at the support for the wrist pin end of the rod for automatically locating the connecting rod in a position with a predetermined selected distance between the axis of the wrist pin hole of the connecting rod and the axis of the boring tool regardless of variations in the diameter of the wrist pin hole.

The claims now appearing in the patent as numbers 8, 9, 10, 11, 12, 13, 14, 15, 16, 17, 18, 19, 20, 21, 22, 23, 24, 25 and 26, should bear the numbers 9, 10, 11, 12, 13, 14, 15, 16, 17, 18, 19, 20, 21, 22, 23, 24, 25, 26 and 27 respectively; and that the said Letters Patent should be read with these corrections therein that the same may conform to the record of the case in the Patent Office.

Signed and sealed this 7th day of April, A. D. 1936.

Leslie Frazer

Acting Commissioner of Patents.

(Seal)